Figure 1:
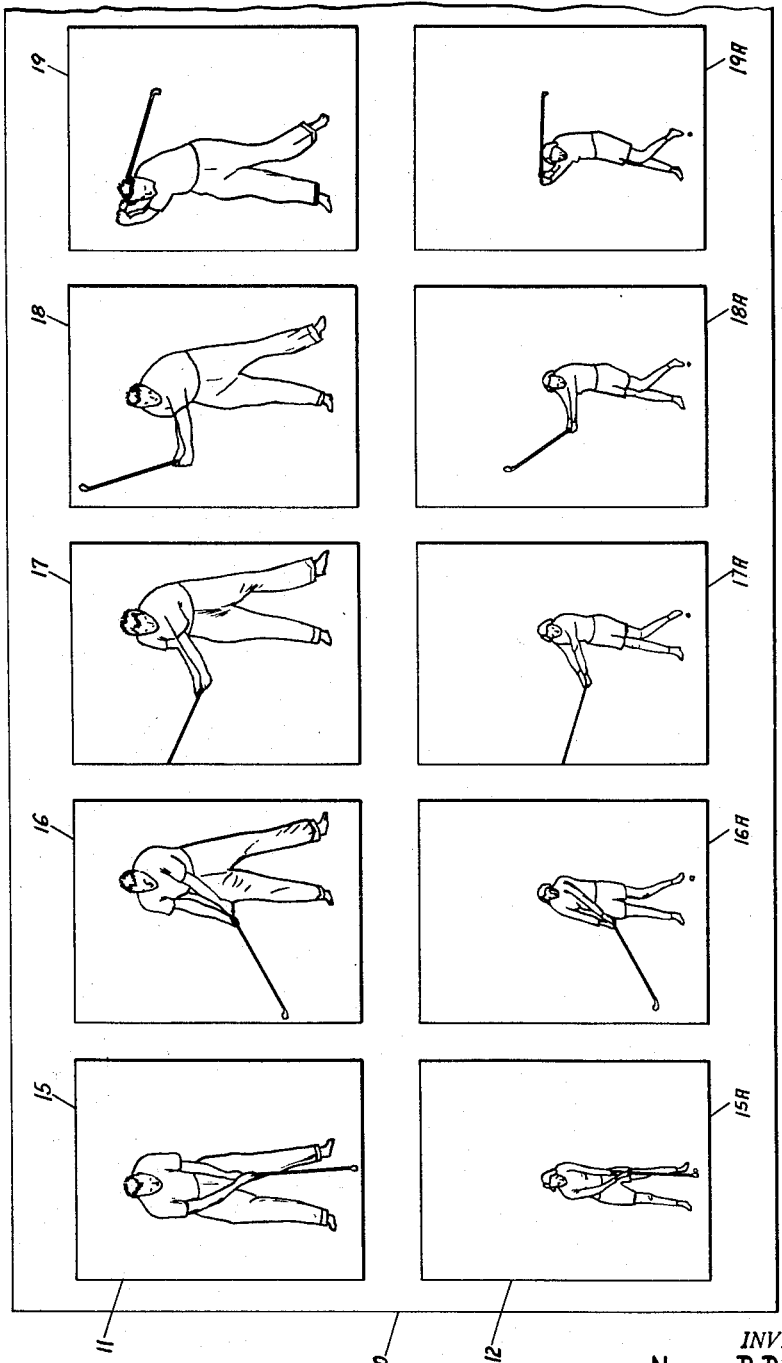

June 7, 1960   N. P. ROSE ET AL   2,939,224
METHOD AND MEANS FOR TEACHING MANUAL SKILLS
Filed Feb. 6, 1959   2 Sheets-Sheet 1

INVENTORS
NELSON P. ROSE AND
ELIZABETH H. ROSE
BY
ATTORNEYS

INVENTORS
NELSON P. ROSE AND
ELIZABETH H. ROSE
By Bates, Peare & McBean
ATTORNEYS

United States Patent Office 2,939,224
Patented June 7, 1960

---

2,939,224

METHOD AND MEANS FOR TEACHING MANUAL SKILLS

Nelson P. Rose and Elizabeth H. Rose, both of 2557 N. Park Blvd., Cleveland Heights, Ohio Filed Feb. 6, 1959, Ser. No. 791,720

5 Claims. (Cl. 35—29)

This invention relates to a method and means for teaching manual skills and particularly those which require coordination in time and position of the parts of the body and equipment for performing the skill.

One form of skill which requires coordination of movements of the body and equipment is the game of golf. One of the difficulties, however, in teaching the form of a golf swing to a pupil is the inability of the pupil to acquire the "feel" or "inner sense" of a correct swing. This applies to the desire of a pupil to sense the "feel" for example, of a straight left arm on the back swing, of avoiding a shift or a twist of the head during the swing, of the weight shift at the start of the down-swing, and of other elements which are usually regarded as essential to a correct swing. Photographs, such as stills, taken at random in the course of a swing of a pupil are not helpful because of the inability to take the photograph of more than one position at a time in an entire swing. Moving pictures will show a complete swing when projected upon a screen, but these afford insufficient opportunity for determining whether any particular position in the source of the swing is precisely that which the pupil is striving to obtain.

An object of the present invention is to provide a method and article by means of which the pupil can ascertain by visual inspection, any fault which occurs at any particular part of the swing, after which, correction can be made and further inspection and study can be accomplished. Additionally, the invention contemplates a permanent record by means of which the swing of a pupil can be compared with that of a standard comparison such as the swing of a golf professional.

We have found that the "feel" of the correct swing can be more readily acquired if the pupil can observe and study photographs of his position at different stages of a swing, and if the photographs are so arranged with respect to photographs taken of a corresponding position in the swing of a golf professional that the pupil may easily compare his movements with those of the professional and detect his (the pupil's) faults. We have also found that this can be accomplished by arranging a series of photographs comprising selections from a moving picture of a "professional," showing the complete swing and by arranging in juxtaposition a series of photographs comprising selections from a moving picture of the pupil showing the complete swing. The selected photographs of the pupil and professional are matched as nearly as possible with respect to the various positions preferably in two rows, with one above the other.

By taking a moving picture from time to time during the course of instruction, and by making a new set of prints from selected frames in the film, and matching them as before with corresponding selected prints of the swing of the "professional" the pupil, as well as the instructor, can ascertain readily the extent of progress which is being made.

Figure 2:
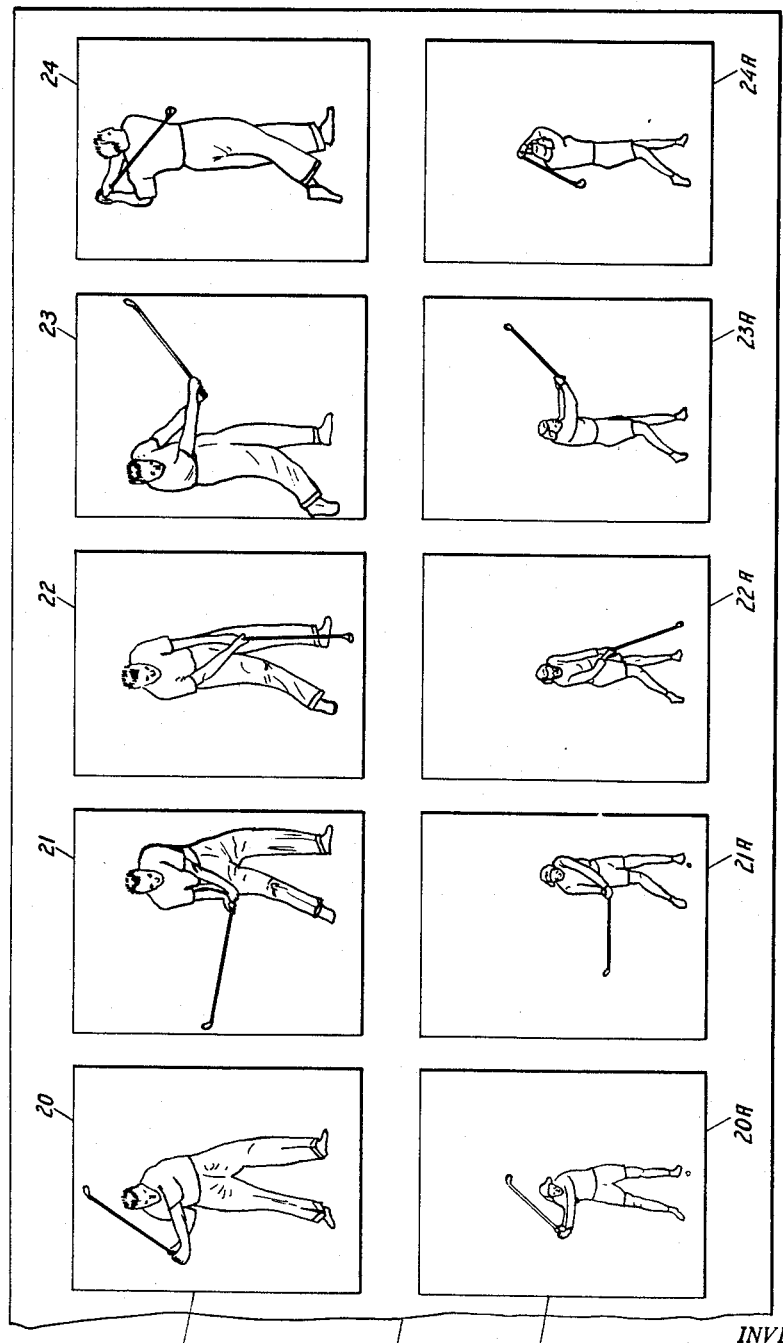

Referring now to the drawings,

Fig. 1 shows a plan view of the left hand portion of a panel having illustrations thereon arranged in accordance with the method of the present invention; and Fig. 2 is a plan view of the right hand portion of the panel which completes the sequence of illustrations that are started in Fig. 1.

For the purpose of illustration, the present invention is shown in connection with the swinging of a golf club, wherein a panel 10 has affixed thereto a series of photographs arranged in two horizontal rows at 11 and 12 respectively. The illustrations in Fig. 1 are continued in Fig. 2 for the purpose of showing a completion of the cycle of movement. The illustrations in row 11 may represent those of a standard of comparison, such as photographs of a golf "professional," while those in row 12 are those of a pupil.

The illustrations in row 11 are prints made from selected frames of a moving picture film showing the golf swing of a professional, while those in row 12 are prints made from selected frames of a moving picture film showing the golf swing of the pupil. The selections are made at representative positions of the professional's swing and then they are matched by selections of the pupil's swing at the positions which correspond most closely to those of the prefessional. The matching is accomplished, in the form illustrated, by affixing the photographs of the pupil to the panel directly beneath those of the professional. Thus, in Fig. 1, the illustrations 15 to 19 show various positions progressively of a professional from the start to the top of the backswing, while those indicated at 15A to 19A show corresponding positions respectively of the pupil. Similarly, in Fig. 2, the illustrations 20 to 24 show representative positions progressively of a professional from the top of the backswing to the end of the follow through, while those shown at 20A to 24A indicate corresponding positions respectively of the pupil.

By detailed study and comparison of the matched photographs, one can ascertain readily the source of a fault in any part of a swing and can then concentrate by practice thereon until the correction is made. During the corrective practice, the pupil will develop a sense of muscular "feel" which results from the corrective change thereby accomplishing the principal object for which this invention has been made. By taking a later moving picture of the pupil's swing and again matching a set of prints, as aforesaid, with that of the professional, the result of the corrective effort becomes immediately apparent.

Although we have described the photos as having been selected at matching positions, it is possible, by means of this invention, to select photos at matching time intervals from the start to the end of a swing. Then, by arranging the photos in two rows, as aforesaid, but in time sequence, we can readily ascertain whether the swing in part, or in its entirety, is timed properly. This is valuable in the presence of a "jerky" or "hurried" swing, or one which is abnormally slow or fast in its entirety.

An advantage of the present invention is that the pupil can readily learn to "feel" the difference between the right and the wrong way to execute each movement of the swing. The matching arrangement of photos, in accordance with this invention, constitutes a method of instruction which is an effective technique for imparting a sense of the proper muscular effort for obtaining the correct movements.

Although the illustrations shown in the drawings represent only the front views of the persons engaged in swinging a golf club, nevertheless the invention is equally applicable to a series of illustrations which would show side views of the professional and pupil from the beginning to the end of a swing. This is beneficial in that it enables a permanent record to be made of views from more than one angle, and thereby enable either the instructor or pupil to more readily detect flaws in all parts of the swing.

While the invention is illustrated in connection with a golf swing, it is to be understood that it is equally applicable to other sports or operations, wherein a permanent record is desired of a series of movements and comparison thereof with a known or accepted standard.

We claim:

1. The method of producing means for use in learning a manual skill requiring coordination in time and position of parts of the body for a cycle of movements comprising, making a continuous moving picture film of a complete cycle of such movements of a person selected for a standard of comparison, making a continuous moving picture film of a complete cycle of such movements of the pupil, removing from the first-named film selected frames which show representative positions, removing from the second-named film selected frames which show substantially the same positions as those selected from the first named film, making prints of the selected frames, affixing the prints of the first film sequentially upon a supporting surface and affixing the prints of the second film sequentially upon the supporting surface and in juxtaposition to the respective prints of the first film showing corresponding positions.

2. The method according to claim 1, wherein the prints taken from the respective films are arranged in rows with the matching positions opposite each other.

3. The method according to claim 1, wherein the prints of the first film are arranged in a horizontal row while those of the second film are arranged in a horizontal row with the matching prints disposed one above the other.

4. The method of producing an aid to learning a manual skill requiring coordination in time and position of parts of the body for a cycle of movements comprising, making a continuous moving picture film of a complete cycle of such movements of a person selected for a standard of comparison, making a continuous moving picture film of a complete cycle of such movements of the pupil, removing from the first-named film selected frames which show positions of the standard at time intervals during the cycle of movements, removing from the second-named film selected frames which show positions of the pupil at time intervals substantially the same as those between the frames selected from the first-named film, making prints of the selected frames, affixing the prints of the first film sequentially upon a supporting surface and affixing the prints of the second film sequentially upon the supporting surface and in juxtaposition to the prints of the first film of matching time intervals.

5. The method of producing means for use by a given pupil in learning a manual skill requiring focusing of the eye upon an object to be manipulated and coordination in time and position of parts of the body for a cycle of movements comprising, selecting a set of pictures which individually show representative progressive positions of an entire person chosen as a standard of comparison at moments throughout a given complete cycle of movements of the skill to be learned, making a continuous moving picture film of a given complete cycle of such movements of the entire pupil, selecting from the film frame pictures which show substantially the same positions as those selected of the standard of comparison person, affixing the selected pictures of the standard of comparison person sequentially upon a supporting surface, and affixing the selected pictures of the pupil sequentially upon the supporting surface and in juxtaposition to the respective pictures of the standard of comparison person showing corresponding positions.

References Cited in the file of this patent

UNITED STATES PATENTS

| | | |
|---|---|---|
| 1,410,811 | Lewis | Mar. 28, 1922 |
| 1,558,762 | Richter | Oct. 27, 1925 |
| 1,819,883 | Fleischer | Aug. 18, 1931 |
| 2,223,849 | Fogler et al. | Dec. 3, 1940 |
| 2,291,173 | Simpson | July 28, 1942 |

UNITED STATES PATENT OFFICE

CERTIFICATE OF CORRECTION

Patent No. 2,939,224                                                                  June 7, 1960

Nelson P. Rose et al.

It is hereby certified that error appears in the printed specification of the above numbered patent requiring correction and that the said Letters Patent should read as corrected below.

Column 1, line 36, for "source" read -- course --.

Signed and sealed this 15th day of November 1960.

(SEAL)
Attest:

KARL H. AXLINE
Attesting Officer

ROBERT C. WATSON
Commissioner of Patents